US009331977B2

(12) United States Patent
Chong et al.

(10) Patent No.: US 9,331,977 B2
(45) Date of Patent: *May 3, 2016

(54) HIGH AVAILABILITY FOR CLOUD-BASED SERVICES

(71) Applicant: RingCentral, Inc., San Mateo, CA (US)

(72) Inventors: John Chong, Union City, CA (US); Dmitriy Alexandrovich Solovey, San Jose, CA (US); Vlad Vendrow, Redwood Shores, CA (US)

(73) Assignee: RingCentral, Inc., Belmont, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/681,829

(22) Filed: Apr. 8, 2015

(65) Prior Publication Data

US 2015/0215269 A1  Jul. 30, 2015

Related U.S. Application Data

(60) Continuation of application No. 14/063,087, filed on Oct. 25, 2013, now Pat. No. 9,026,636, which is a division of application No. 13/629,469, filed on Sep. 27, 2012, now Pat. No. 8,606,938.

(51) Int. Cl.
*G06F 15/16* (2006.01)
*H04L 29/12* (2006.01)
*H04L 12/24* (2006.01)
*G06F 11/20* (2006.01)

(52) U.S. Cl.
CPC ........ *H04L 61/1511* (2013.01); *H04L 41/0659* (2013.01); *H04L 41/50* (2013.01); *G06F 11/2038* (2013.01); *H04L 61/609* (2013.01)

(58) Field of Classification Search
USPC .................. 709/225, 220; 370/390, 230, 468
See application file for complete search history.

(56) References Cited

U.S. PATENT DOCUMENTS

| | | | |
|---|---|---|---|
| 6,625,645 B1 | 9/2003 | Van Horne et al. | |
| 6,785,704 B1* | 8/2004 | McCanne | 718/105 |
| 7,209,455 B2* | 4/2007 | Yee et al. | 370/310.1 |
| 7,653,085 B2* | 1/2010 | Dahl et al. | 370/468 |
| 7,734,730 B2* | 6/2010 | McCanne | 709/219 |
| 7,835,314 B2* | 11/2010 | Yee et al. | 370/310.1 |
| 7,912,057 B2* | 3/2011 | Petry et al. | 370/390 |
| 7,974,193 B2* | 7/2011 | Raveendran et al. | 370/230 |
| 8,261,351 B1 | 9/2012 | Thornewell et al. | |
| 8,606,938 B1 | 12/2013 | Chong et al. | |
| 2005/0010653 A1* | 1/2005 | McCanne | 709/219 |
| 2010/0217837 A1 | 8/2010 | Ansari et al. | |
| 2011/0179101 A1 | 7/2011 | Ravichandran et al. | |
| 2012/0066360 A1 | 3/2012 | Ghosh | |

(Continued)

FOREIGN PATENT DOCUMENTS

WO  WO 2014/052027  4/2014

OTHER PUBLICATIONS

U.S. Office Action dated Jun. 24, 2013, issued in U.S. Appl. No. 13/629,469.

(Continued)

*Primary Examiner* — Tammy Nguyen
(74) *Attorney, Agent, or Firm* — Weaver Austin Villeneuve & Sampson LLP

(57) ABSTRACT

High availability mechanisms are described for cloud-based services such as voice-over-IP (VoIP) services.

19 Claims, 8 Drawing Sheets

(56) References Cited

U.S. PATENT DOCUMENTS

2012/0254421 A1 10/2012 Gagliardi et al.
2014/0089488 A1 3/2014 Chong et al.

OTHER PUBLICATIONS

U.S. Notice of Allowance dated Oct. 9, 2013, issued in U.S. Appl. No. 13/629,469.
U.S. Office Action dated Aug. 29, 2014, issued in U.S. Appl. No. 14/063,087.
U.S. Notice of Allowance dated Jan. 13, 2015, issued in U.S. Appl. No. 14/063,087.
Coltun, R. et al. "OSPF for IPv6," RFC 5340, Network Working Group, Standards Track, © The Internet Society, Jul. 2008. (95 Pages).
Gulbrandsen, A., et al. "A DNS RR for Specifying the Location of Services (DNS SRV)," RFC 2782, Network Working Group, Standards Track, © The Internet Society, Feb. 2000. (13 Pages).
Hardie, T. "Distributing Authoritative Name Servers Via Shared Unicast Addresses," RFC 3258, Network Working Group, Informational, © The Internet Society, Apr. 2002. (12 Pages).
Moy, J. "OSPF Version 2," RFC 2328, Network Working Group, Standards Track, © The Internet Society, Apr. 1998. (245 Pages).
Rekhter, Y. et al. "A Border Gateway Protocol 4 (BGP-4)," RFC 4271, Network Working Group, Standards Track, © The Internet Society, Jan. 2006. (105 Pages).
Rosenberg, J. et al. "SIP: Session Initial Protocol," RFC 3261, Network Working Group, Standards Track, © The Internet Society, Jun. 2002. (270 Pages).
International Search Report dated Jan. 16, 2014, issued in International Application No. PCT/US2013/059492.
International Written Opinion dated Jan. 16, 2014, issued in International Application No. PCT/US2013/059492.

* cited by examiner

| Service type | Protocol | DNS name (custom zone grouping) | TTL | Rec. type | priority | wight* | port | Pointer to DNS A record | |
|---|---|---|---|---|---|---|---|---|---|
| _sip. | _udp. | sipwest.ringcentral.com | 86400 | IN SRV | 0 | 0 | 5060 | sip11.ringcentral.com | ⎫ DNS SRV rec group for devices close to POP1 (SJC) |
| _sip. | _udp. | sipwest.ringcentral.com | 86400 | IN SRV | 0 | 0 | 5060 | sip12.ringcentral.com | |
| _sip. | _udp. | sipwest.ringcentral.com | 86400 | IN SRV | 0 | 0 | 5060 | sip13.ringcentral.com | |
| _sip. | _udp. | sipwest.ringcentral.com | 86400 | IN SRV | 1 | 0 | 5060 | sip21.ringcentral.com | |
| _sip. | _udp. | sipwest.ringcentral.com | 86400 | IN SRV | 1 | 0 | 5060 | sip22.ringcentral.com | |
| _sip. | _udp. | sipwest.ringcentral.com | 86400 | IN SRV | 1 | 0 | 5060 | sip23.ringcentral.com | ⎭ |
| _sip. | _udp. | sipeast.ringcentral.com | 86400 | IN SRV | 0 | 0 | 5060 | sip21.ringcentral.com | ⎫ DNS SRV rec group for devices close to POP2 (IAD) |
| _sip. | _udp. | sipeast.ringcentral.com | 86400 | IN SRV | 0 | 0 | 5060 | sip22.ringcentral.com | |
| _sip. | _udp. | sipeast.ringcentral.com | 86400 | IN SRV | 0 | 0 | 5060 | sip23.ringcentral.com | |
| _sip. | _udp. | sipeast.ringcentral.com | 86400 | IN SRV | 1 | 0 | 5060 | sip11.ringcentral.com | |
| _sip. | _udp. | sipeast.ringcentral.com | 86400 | IN SRV | 1 | 0 | 5060 | sip12.ringcentral.com | |
| _sip. | _udp. | sipeast.ringcentral.com | 86400 | IN SRV | 1 | 0 | 5060 | sip13.ringcentral.com | ⎭ |

*FIG. 4*

```
_sip._udp.sipwest.ringcentral.com 86400 IN SRV 0 0 5060 sip11.ringcentral.com
_sip._udp.sipwest.ringcentral.com 86400 IN SRV 0 0 5060 sip12.ringcentral.com
_sip._udp.sipwest.ringcentral.com 86400 IN SRV 0 0 5060 sip13.ringcentral.com
_sip._udp.sipwest.ringcentral.com 86400 IN SRV 1 0 5060 sip21.ringcentral.com
_sip._udp.sipwest.ringcentral.com 86400 IN SRV 1 0 5060 sip22.ringcentral.com
_sip._udp.sipwest.ringcentral.com 86400 IN SRV 1 0 5060 sip23.ringcentral.com
_sip._udp.sipany.ringcentral.com 86400 IN SRV 2 0 5060 sipany1.ringcentral.com
_sip._udp.sipany.ringcentral.com 86400 IN SRV 2 0 5060 sipany2.ringcentral.com
```

*FIG. 8*

HIGH AVAILABILITY FOR CLOUD-BASED SERVICES

RELATED APPLICATION DATA

The present application is a continuation of and claims priority under 35 U.S.C. 120 to U.S. patent application Ser. No. 14/063,087 for High Availability for Cloud-Based Services filed on Oct. 25, 2013, which is a divisional of and claims priority under 35 U.S.C. 120 to U.S. patent application Ser. No. 13/629,469 for High Availability for Cloud-Based Services filed on Sep. 27, 2012, now U.S. Pat. No. 8,606,938, the entire disclosure of which is incorporated herein by reference for all purposes.

BACKGROUND

The present invention relates to systems and methods for providing cloud-based services and, in particular, to techniques for ensuring high availability for such services.

The term "cloud computing" refers to computing models for enabling ubiquitous, convenient, on-demand network access to a shared pool of configurable computing resources (e.g., networks, servers, storage, applications, and services). Cloud-based services are rapidly becoming the primary way in which services are provided to businesses and consumers over the Internet and the World Wide Web.

Users of cloud-based services generally expect such services to be available any time, in any geographic location, and using any of a wide variety of client devices. These expectations of "high availability" present a number of technical challenges for providers of cloud-based services.

SUMMARY OF THE INVENTION

According to the present invention, methods, apparatus, systems, and computer program products are provided for promoting high availability of services over a network, e.g., cloud-based services.

According to a particular class of implementations, methods, apparatus, systems, and computer program products are provided for provisioning a client device to access a service provided by a services network having a plurality of service end points associated with a plurality of geographically distinct data centers. In response to a request from the client device to access the service, the client device is provisioned with a plurality of domain name system (DNS) service records. Each of a first subset of the DNS service records corresponds to a unicast destination address. Each unicast destination address is associated with one or more of the service end points in only a single one of the data centers. Each of a second subset of the DNS service records corresponds to an anycast destination address. Each anycast destination address is simultaneously associated with one or more of the service end points in at least two of the data centers.

According to some implementations, the first subset of DNS service records is higher priority than the second subset of DNS service records.

According to some implementations, the first subset of DNS service records includes a first group of one or more DNS service records corresponding to a first one of the data centers, and a second group of one or more DNS service records corresponding to a second one of the data centers. The first group of DNS service records is higher priority than the second group of DNS service records.

According to some implementations, the second subset of DNS service records includes a first group of one or more DNS service records corresponding to both of first and second ones of the data centers, and a second group of one or more DNS service records corresponding to both of the first and second data centers. The first group of DNS service records is higher priority than the second group of DNS service records.

According to another class of implementations, methods, apparatus, systems, and computer program products are provided for accessing a service provided by a services network having a plurality of service end points associated with a plurality of geographically distinct data centers. A first one of a plurality of domain name system (DNS) service records is retrieved. Each of a first subset of the DNS service records corresponds to a unicast destination address. Each unicast destination address is associated with one or more of the service end points in only a single one of the data centers. Each of a second subset of the DNS service records corresponds to an anycast destination address. Each anycast destination address is simultaneously associated with one or more of the service end points in at least two of the data centers. A first request to access the service is transmitted to the destination address corresponding to the first DNS service record. Where the first request to access the service is not successful, or where a connection to the service established using the first DNS service record is interrupted, a second one of the plurality of DNS service records is retrieved. A second request to access the service is transmitted to the destination address corresponding to the second DNS service record.

According to some implementations, the first subset of DNS service records is higher priority than the second subset of DNS service records, and attempts to connect with the service are made using all of the first subset of DNS service records before an attempt to connect with the service is made using any of the second subset of DNS service records.

According to some implementations, the first subset of DNS service records includes a first group of one or more DNS service records corresponding to a first one of the data centers, and a second group of one or more DNS service records corresponding to a second one of the data centers. The first group of DNS service records is higher priority than the second group of DNS service records. Attempts to connect with the service are made using all of the first group of DNS service records before an attempt to connect with the service is made using any of the second group of DNS service records.

According to some implementations, the second subset of DNS service records includes a first group of one or more DNS service records corresponding to both of first and second ones of the data centers, and a second group of one or more DNS service records corresponding to both of the first and second data centers. The first group of DNS service records is higher priority than the second group of DNS service records, and attempts to connect with the service are made using all of the first group of DNS service records before an attempt to connect with the service is made using any of the second group of DNS service records.

According to another class of implementations, at least one non-transitory computer-readable medium has a data structure stored therein for enabling a client device to access a service provided by a services network having a plurality of service end points associated with a plurality of geographically distinct data centers. The data structure includes a plurality of domain name system (DNS) service records. Each of a first subset of the DNS service records corresponds to a unicast destination address. Each unicast destination address is associated with one or more of the service end points in only a single one of the data centers. Each of a second subset of the DNS service records corresponds to an anycast destination address. Each anycast destination address is simultaneously associated with one or more of the service end points in at least two of the data centers. Each of the DNS service records is configured to enable a client device to access the service using the corresponding destination address.

According to some implementations, the first subset of DNS service records is higher priority than the second subset of DNS service records.

According to some implementations, the first subset of DNS service records includes a first group of one or more DNS service records corresponding to a first one of the data centers, and a second group of one or more DNS service records corresponding to a second one of the data centers. The first group of DNS service records is higher priority than the second group of DNS service records.

According to some implementations, the second subset of DNS service records includes a first group of one or more DNS service records corresponding to both of first and second ones of the data centers, and a second group of one or more DNS service records corresponding to both of the first and second data centers. The first group of DNS service records is higher priority than the second group of DNS service records.

According to another class of implementations, a services network is provided that includes a plurality of computing devices deployed in a plurality of data centers. The plurality of computing devices is configured to provide a plurality of service end points associated with each of the data centers. Each of the service end points is configured to provide access to a service to requesting client devices. One or more of the computing devices in each data center is further configured to associate a range of unicast destination addresses and a range of anycast destination addresses with the corresponding data center. Each range of unicast destination addresses is associated with only one of the data centers. Each range of anycast destination addresses is associated with two or more of the data centers. The plurality of computing devices are configured to provision each of first ones of the requesting clients to access the service with a plurality of domain name system (DNS) service records. Each of a first subset of the DNS service records corresponds to a unicast destination address in one of the ranges of unicast destination addresses. Each unicast destination address is associated with one or more of the service end points in the corresponding data center. Each of a second subset of the DNS service records corresponds to an anycast destination address in one of the anycast destination ranges. Each anycast destination address is simultaneously associated with one or more of the service end points in at least two of the data centers.

According to some implementations, a first one of the anycast destination addresses is associated with first and second ones of the data centers, and traffic corresponding to the first anycast destination address is routed to the second data center within the services network. According to some implementations, the traffic corresponding to the first anycast destination address is handled locally where the second data center is unable to handle the traffic.

According to some implementations, a first one of the anycast destination addresses is associated with first and second ones of the data centers, and both the first and second data centers handle traffic corresponding to the first anycast destination address locally.

According to some implementations, each of second ones of the requesting client devices is provisioned using only a single one of the DNS service records from the second subset of DNS service records.

According to some implementations, the plurality of DNS service records with which each of the first requesting client devices is provisioned includes two or more DNS service records from the first subset of DNS service records, each having a priority associated therewith. The priorities of the two or more DNS service records correspond to a load balancing scheme.

According to some implementations, the first subset of DNS service records is higher priority than the second subset of DNS service records.

According to some implementations, the first subset of DNS service records includes a first group of one or more DNS service records corresponding to a first one of the data centers, and a second group of one or more DNS service records corresponding to a second one of the data centers. The first group of DNS service records is higher priority than the second group of DNS service records.

According to some implementations, the second subset of DNS service records includes a first group of one or more DNS service records corresponding to both of first and second ones of the data centers, and a second group of one or more DNS service records corresponding to both of the first and second data centers. The first group of DNS service records is higher priority than the second group of DNS service records.

According to some implementations, the service comprises a voice-over-IP service.

According to another class of implementations, a client device is configured to access a service provided by a services network having a plurality of service end points associated with a plurality of geographically distinct data centers. The client device includes one or more processors and memory configured to access the service using a plurality of domain name system (DNS) service records. Each of a first subset of the DNS service records corresponds to a unicast destination address. Each unicast destination address is associated with one or more of the service end points in only a single one of the data centers. Each of a second subset of the DNS service records corresponds to an anycast destination address. Each anycast destination address is simultaneously associated with one or more of the service end points in at least two of the data centers. Each of the DNS service records is configured to enable a client device to access the service using the corresponding destination address.

According to some implementations, the first subset of DNS service records is higher priority than the second subset of DNS service records, and the client device is configured to attempt to connect with the service using all of the first subset of DNS service records before attempting to connect with the service using any of the second subset of DNS service records.

According to some implementations, the first subset of DNS service records includes a first group of one or more DNS service records corresponding to a first one of the data centers, and a second group of one or more DNS service records corresponding to a second one of the data centers. The first group of DNS service records is higher priority than the second group of DNS service records, and the client device is configured to attempt to connect with the service using all of the first group of DNS service records before attempting to connect with the service using any of the second group of DNS service records.

According to some implementations, the second subset of DNS service records includes a first group of one or more DNS service records corresponding to both of first and second ones of the data centers, and a second group of one or more DNS service records corresponding to both of the first and second data centers. The first group of DNS service records is higher priority than the second group of DNS service records, and the client device is configured to attempt to connect with the service using all of the first group of DNS service records before attempting to connect with the service using any of the second group of DNS service records.

According to some implementations, the client device may be any one of a cell phone, a smart phone, a tablet, a laptop computer, a desktop computer, a telephone, an Internet Protocol phone, a set top box, or a gaming console.

According to another class of implementations, methods, apparatus, systems, and computer program products are provided for providing a communication service. A plurality of service end points associated with each of a plurality of geographically distinct data centers is provided. Each of the service end points is configured to provide access to the communication service to requesting client devices. A range of anycast destination addresses is simultaneously associated with two or more of the data centers. Requesting client devices are provisioned to access the communication service using anycast destination addresses in the anycast destination range. In response to requests from the requesting client devices using the anycast destination addresses, the communication service is provided to the requesting client devices with the service end points associated with at least one of the two or more data centers.

According to some implementations, a first one of the anycast destination addresses is associated with first and second ones of the data centers. Traffic corresponding to the first anycast destination address is routed from the first data center to the second data center within the services network. According to some implementations, the traffic corresponding to the first anycast destination address is handled locally at the first data center where the second data center is unable to handle the traffic.

According to some implementations, a first one of the anycast destination addresses is associated with first and second ones of the data centers, and traffic corresponding to the first anycast destination address is handled locally in both the first and second data centers.

A further understanding of the nature and advantages of the present invention may be realized by reference to the remaining portions of the specification and the drawings.

BRIEF DESCRIPTION OF THE DRAWINGS

FIG. 4 shows examples of DNS SRV records.

FIG. 8 shows further examples of DNS SRV records.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Various implementations are described herein in the context cloud-based communication services, e.g., telephony (e.g., VoIP) and fax services. However, it should be understood that the scope of the invention is much broader, encompassing a wide variety of systems and services provided using virtually any network-based computing paradigm. To be clear, the techniques described herein may be used to support any type of network or cloud-based service or set of services. Therefore, references to specific applications herein are not intended and should not be used to limit the scope of the invention.

Figure 1:
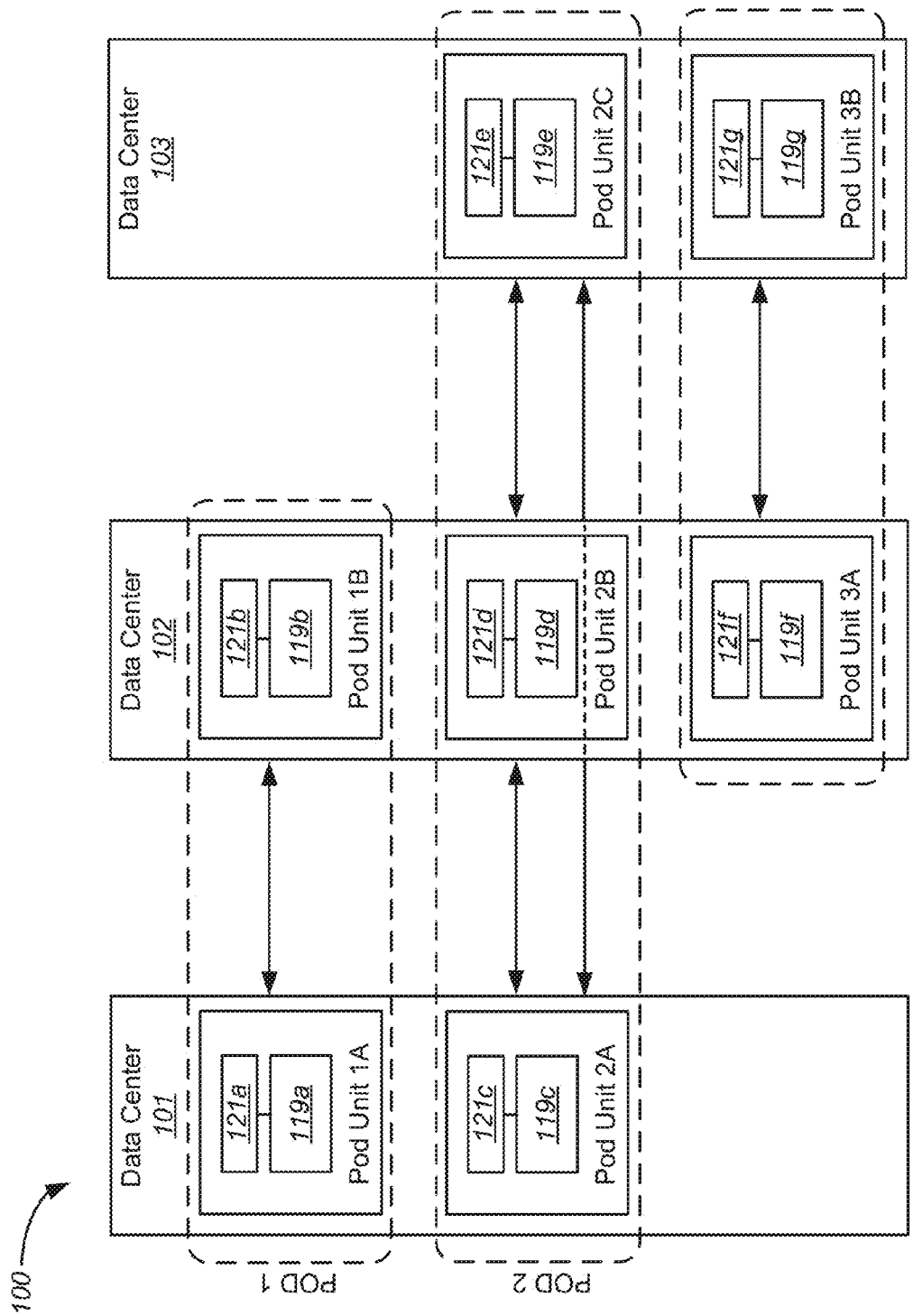
FIGS. 1 and 2 are simplified diagrams of an example of a communication system with which various embodiments described herein may be implemented.
Figure 2:
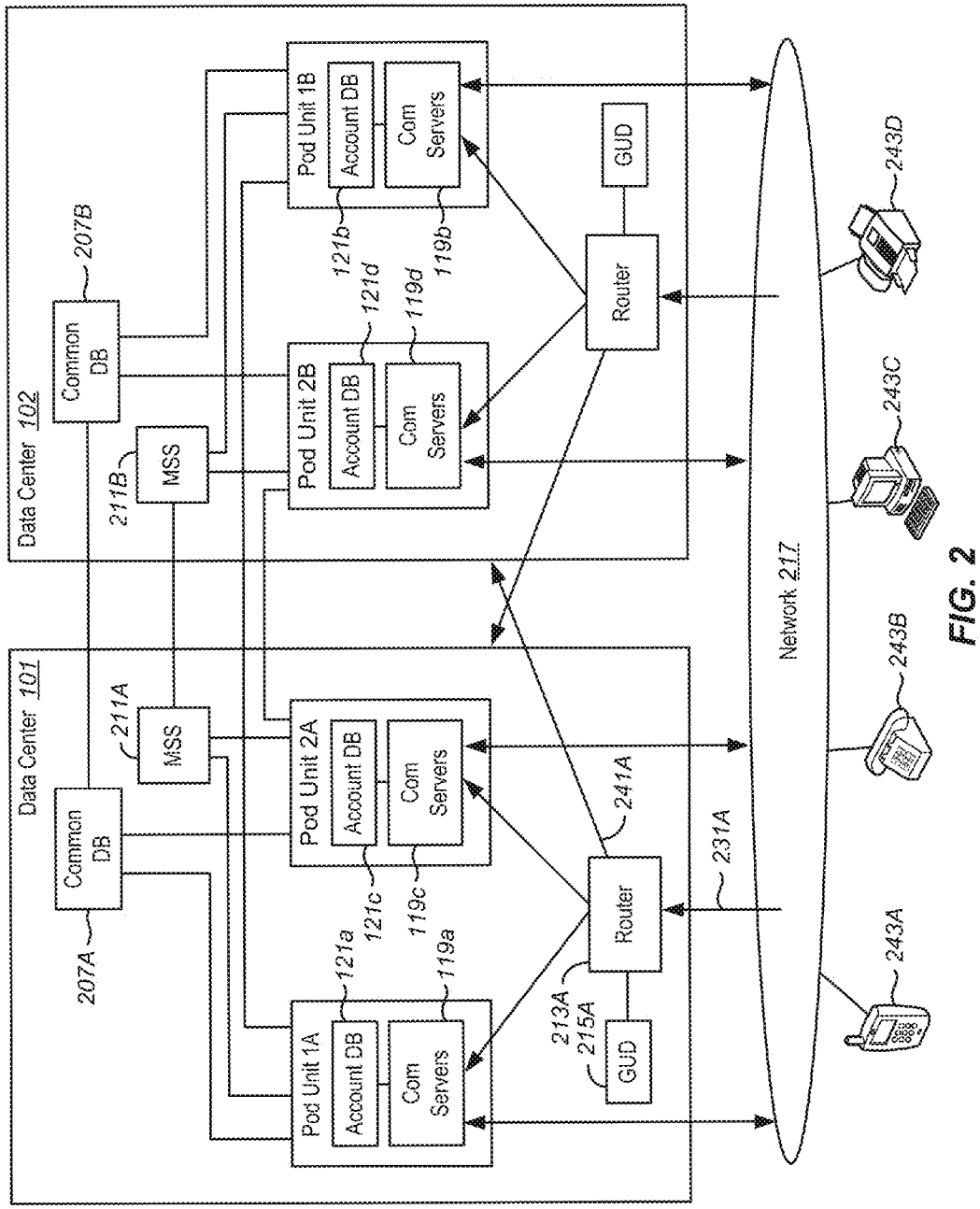

Various embodiments described herein may be implemented in or in conjunction with a cloud-based communication system such as the one illustrated in FIGS. 1 and 2. FIG. 1 shows a communication system 100 which can be, for example, a cloud-based telephony system that provides voice and video over IP, fax services, etc. Communication system 100 includes data centers 101, 102, and 103. Each data center is a point of presence (POP) that includes the network resources (e.g., servers, routers, switches, network connections, etc.) necessary to support the services provided by communication system 100. Each data center is typically located in a different geographical region.

In this example, communication system 100 includes three user points of data (pods), i.e., pods 1, 2 and 3, each of which is a logical grouping of two or more pod units situated in different data centers. Each pod serves a different subset of user accounts. In this example, each pod unit (e.g., unit 2A) serves the same subset of users as the other pod units within the same pod (e.g., pod units 2B and 2C). Each pod unit includes a communication server 119a-119g configured to provide substantially the same services to the same subset of users as the other pod units within the same pod. Each pod unit also includes an account database 121a-121g configured to support the respective communication servers for the corresponding subset of users.

FIG. 2 shows various components of communication system 100 of FIG. 1. Specifically, FIG. 2 shows the various interconnections within and between data centers 101 and 102. Both data centers are in communication with network 217. Service requests from various communication devices 243A-243D are routed through network 217 to either or both of the data centers. Devices 243A-243D represent a great diversity of client devices that may connect with a services system designed in accordance with one or more embodiments of the present invention. Such client devices may include, for example (and without limitation), cell phones, smart phones, tablets, laptop and desktop computers, conventional telephones, IP phones, set top boxes, gaming consoles, etc. Reference to specific client device types should therefore not be used to limit the scope of the invention.

Data center 101 includes pod units 1A and 2A, a common database (CDB) 207A, a message storage system (MSS)

211A, a router 213A, and a global user directory (GUD) 215A. Additional pod units (not shown) may also be included in data center 101. Data center 102 is similarly configured and includes components that operate substantially the same as those in data center 101. Data centers 101 and 102 provide backup and redundancy to one another in the event of failure.

Communication servers 119 provide telecommunication services (e.g., voice, video, email, and/or facsimile) to corresponding subsets of users. Each server 119 may also provide other services including, for example, user account management and configuration, billing services, accounting services, etc. Each pod unit includes an account database 121 to support the communication server(s) for that particular pod unit, storing configuration details and other information regarding each user's account.

Pod units 1A and 1B are in communication with one another so that the data on their respective account databases are synchronized across data centers. Data center 101 includes router 213A to receive an incoming service request 231A from network 217. Router 213A parses the incoming service request to identify or extract a user key and queries GUD 215A to determine which pod is associated with the user key. Once the associated pod has been identified router 213A routes the service request to the pod unit in the data center associated with the identified pod. If the pod unit associated with the identified pod is not associated with data center 101, router 213A may route the service request to another data center (e.g., data center 102 as indicated by the arrow 241A).

Each pod unit of the data center 101 is also coupled to MSS 211A which stores files for the users served by pod units 1A and 2A. These files may include, for example, messages (e.g., voicemails and facsimiles), user logs, system messages, system and user call prompts (e.g., auto-attendant or user-recorded greetings), and other types of call-related or electronic messages. The contents of MSS 211A are synchronized with other data centers (e.g., synchronized with MSS 211B of data center 102).

Each pod unit in data center 101 is coupled to common database 207A which stores shared data for all of the pods, and stores consolidated information from account databases 121. Common database 207A also facilitates changes to the pod databases. For example, common database 207A may store data for applications that provide the services on communication servers 119. Different versions of the applications data may be stored in common database 207A which allow changes and upgrades to communication servers 119 to be implemented efficiently and conveniently. Changes may be made to common database 207A and propagated to pod units 1A and 2A. Common database 207A is synchronized across data centers to other common databases (e.g., common database 207B of data center 102). Common database 207A, MSS 211A, router 213A, and GUD 215A form a common layer of resources that are shared by all pod units in data center 101.

For more information regarding the nature of such a system with which various embodiments described herein may be used, please refer to U.S. patent application Ser. No. 12/957,125 entitled User Partitioning in a Communication System filed on Nov. 30, 2010, now U.S. Pat. No. 8,787,367, the entire disclosure of which is incorporated herein by reference for all purposes.

As will be understood, the diversity of client devices (e.g., devices 243A-243D) that providers of cloud-based services would like to be able to support presents a number of challenges, not only with respect to provisioning the various types of devices to facilitate access to the services, but also with respect to ensuring high availability of the services. Therefore, according to various implementations, a cloud-based services system (e.g., system 100 of FIGS. 1 and 2) may employ multiple techniques for ensuring high availability of services in the face of the many possible types of interruptions that may occur.

According to a particular implementation in which at least some of the devices accessing a cloud-based service are equipped with advanced DNS resolving mechanisms, a cloud-based services system is configured to provide high availability using appropriately configured DNS service records.

The Domain Name System (DNS) is a hierarchical distributed naming system for computers, services, or any resource connected to the Internet or a private network. It associates various information with domain names assigned to each of the participating entities. A Domain Name Service resolves queries for these names into IP addresses for the purpose of locating computer services and devices worldwide. A DNS service record (SRV record) is a specification of data in the DNS defining the location, i.e. the hostname and port number, of servers for specified services.

An SRV record has the form:
_service._proto.name TTL class SRV priority weight port target
in which "service" is the symbolic name of the desired service; "proto" is the transport protocol of the desired service (usually either TCP or UDP); "name" is the domain name for which the record is valid; "TIL" is the standard DNS time to live field; "class" is the standard DNS class field (i.e., IN); "priority" is the priority of the target host (lower value means more preferred); "weight" is a relative weight for records with the same priority; "port" is the TCP or UDP port on which the service is to be found; and "target" is the canonical hostname of the machine providing the service.

The priority field determines the precedence of use of the record's data. When attempting to connect with the corresponding cloud-based service, clients use the SRV record with the lowest-numbered priority value first, and fall back to other records of equal or higher priority if the connection to the host fails. If a service has multiple SRV records with the same priority value, clients use the weight field to determine which host to use. The weight value is relevant only in relation to other weight values for the service, and only among records with the same priority value. The DNS SRV is defined in RFC 2782 from the IETF Network Working Group published in February 2000, the entirety of which is incorporated herein by reference for all purposes.

Some Internet protocols such as the Session Initiation Protocol (SIP) often employ or even require SRV support by network elements. SIP is an IETF-defined signaling protocol widely used for controlling communication sessions such as voice and video calls over the Internet Protocol (IP). SIP can be used for creating, modifying and terminating two-party (unicast) or multiparty (multicast) sessions, and may be one of the core protocols employed by systems such as shown in and described above with reference to FIGS. 1 and 2. The latest version of the SIP specification is RFC 3261 from the IETF Network Working Group published in June 2002, the entirety of which is incorporated herein by reference for all purposes.

According to a specific class of implementations, client devices compatible with DNS SRV are provisioned with a DNS name associated with multiple DNS SRV records, each of which, in this example, corresponds to one of a plurality of SIP end points (i.e., servers) associated with that DNS name. As will be discussed, such client devices are therefore able to locate and perform failover to alternative SIP end points without rediscovery or reprovisioning. An example of such an implementation may be understood with reference to FIGS. 3 and 4.

Figure 3:
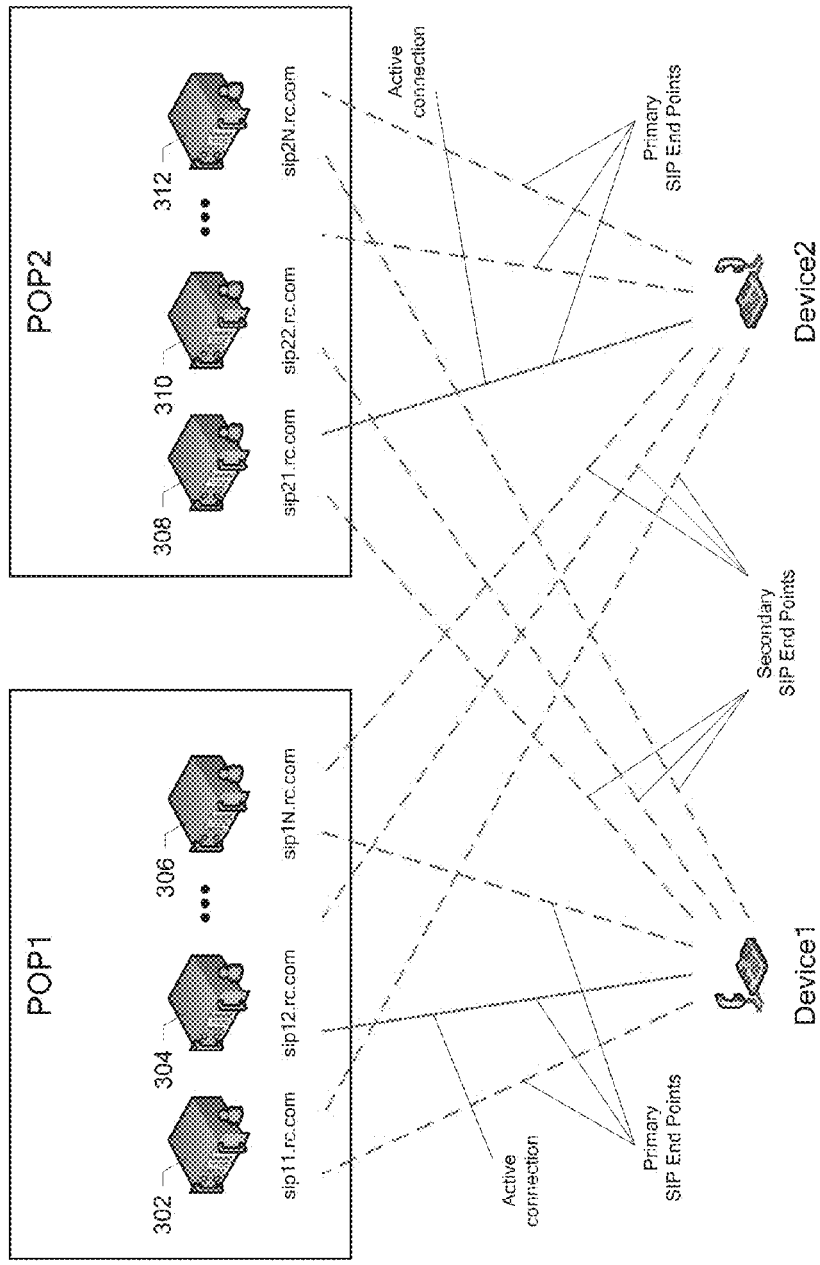
FIG. 3 is a simplified diagram of a services system illustrating high availability mechanisms.

FIG. 3 shows an example of a services system 300 (e.g., a voice/video-over-IP communication system as described above with reference to FIGS. 1 and 2) having two data centers; i.e., POP1 and POP2. Each data center includes N SIP end points; i.e., servers 302-312. Each of Device1 and Device 2 is provisioned with one or more DNS SRV records for each data center, with the SRV record(s) for one data center (e.g., preferably the geographically nearer data center) being primary for that device and the SRV record(s) for the other data center being secondary for that device. In the particular implementation shown, each device is provisioned with multiple SRV records for each data center, with the SRV records for the closer data center being the primary pool of SIP end points and the SRV records for the other data center being the secondary pool of SIP end points.

FIG. 4 shows examples of DNS SRV records for the system of FIG. 3 in which the number N of SIP end points in each data center is 3. As shown, the DNS SRV records for client devices closer to POP1, e.g., Device1, include records for all 6 SIP end points in both data centers, with the records for the end points in POP1 (sip11, sip12, and sip13) having a higher priority, i.e., in this example a priority field specifying "0," than the priority of end points in POP2 (sip21, sip22, and sip23), i.e., a priority field specifying "1." Similarly, the DNS SRV records for client devices closer to POP2, e.g., Device 2, also include records for all 6 SIP end points, but with the priorities reversed.

In this example, the weights within each priority group are the same, in which case the SIP end point to which the client device connects would be chosen at random from among available SIP end points in a priority group. This effects a load balancing among the end points in a priority group which may be manipulated by adjusting the weights to achieve a desired traffic distribution among network resources. The weights might also be manipulated for other purposes, e.g., to effect a desired order in which client devices request connections in cases where multiple connection requests are required.

When a provisioned client device attempts to connect with the service being provided by system 300 it first attempts to connect with an end point in the highest priority group of its DNS SRV records. This has the desirable effect that the client device first attempts to connect with the geographically closer data center. If the requested end point in the first priority group is not available, the client device automatically attempts to connect with one of the other end points in the same group. If none of the end points in the first priority group are available, the client device then automatically attempts to connect with one of the end points in the second priority group, i.e., the client device automatically fails over to the other data center.

It should be noted that implementations are contemplated in which the number of priority groups and/or the number of SRV records (and therefore end points) within each priority group with which client devices may be provisioned may vary from the example described above. For example, some implementations may include additional priority groups beyond the two described. In addition, each priority group may include anywhere from one to an arbitrary number of SRV records. Weighting with and between or among priority groups may also be manipulated to achieve a variety of effects. Other variations will be apparent to those of skill in the art.

Figure 5:
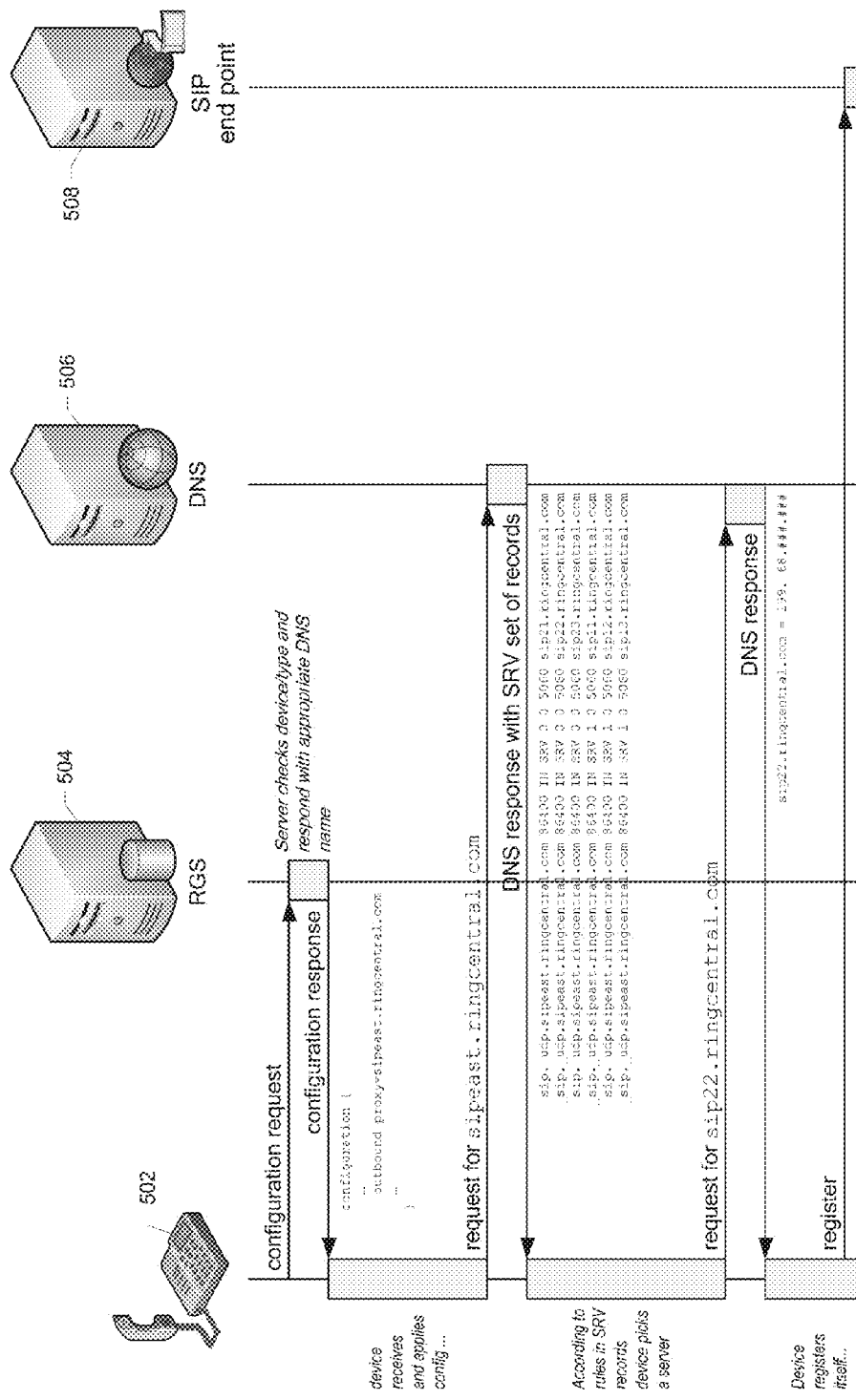
FIG. 5 illustrates an example of a flow in which a client device registers with a service.

FIG. 5 illustrates an example of how a client device may be provisioned and register with a service system such as the system of FIGS. 3 and 4. Client device 502 sends a configuration request to registration (RGS) server 504 which determines the client device type and sends a configuration response back to the client device with the appropriate DNS name. Client device 502 then transmits a service request to an appropriate DNS server 506 which responds with a set of SRV records for the corresponding service. In this example, DNS server 506 returns the SRV records corresponding to POP2 and POP1 in the example of FIGS. 3 and 4, with the records for POP2 being higher priority. Client device 502 then selects one of the SRV records from the higher priority group (in this case the one corresponding to end point sip22 and generates a connection request for that end point. DNS server 506 replies with the IP address, with which client device 502 generates a registration request to the corresponding SIP end point 508. As discussed above, because it's been provisioned with multiple SRV records for multiple data centers, client device 502 can automatically attempt to connect with other end points if an attempt to connect fails for any reason.

As will be understood by those of skill in the art, not all client devices which attempt to connect with a services system (such as those described above with reference to FIGS. 1-3) support advanced DNS resolving mechanisms such as DNS SRV. A particular challenge in supporting such devices relates to the fact that many failover schemes for cloud-based services require the client device to discover the new location to reconnect with the service. There are a number of variables on the client side that make such schemes inefficient. Even when done relatively gracefully, a conventional DNS failover can take minutes. This is clearly unacceptable for many services.

As with the DNS SRV failover mechanism described above, the idea is to provide a failover mechanism such that, upon a failure or interruption occurring, the service remains available to any client device (including those that do not support DNS SRV) without the client device being aware that a change has occurred. Therefore, according to another class of implementations, high availability is promoted for such devices using IP anycast.

IP anycast (also referred to simply as "anycast") is a network addressing and routing methodology in which datagrams from a single sender are routed to the topologically nearest node in a group of potential receivers all identified by the same destination address. On the Internet, anycast is typically implemented by using the Border Gateway Protocol (BGP) to simultaneously announce the same destination IP address range from multiple different places on the Internet. This results in packets addressed to destination addresses in this range being routed to the geographically nearest point on the Internet announcing the given destination IP address. The use of anycast to provide DNS services is described in RFC 3258 from the IETF Network Working Group published in April 2002, the entirety of which is incorporated herein by reference for all purposes.

BGP is the protocol which makes core routing decisions on the Internet. It maintains a table of IP networks or prefixes which designate network "reach-ability" among autonomous systems. It is often described as a path vector protocol. When BGP runs between two peers in the same autonomous system it is referred to as Internal BGP (IBGP). When it runs between autonomous systems it is referred to as External BGP (EBGP). Version 4 of BGP is described in RFC 4271 from the IETF Network Working Group published in January 2006, the entirety of which is incorporated herein by reference for all purposes.

Figure 6:
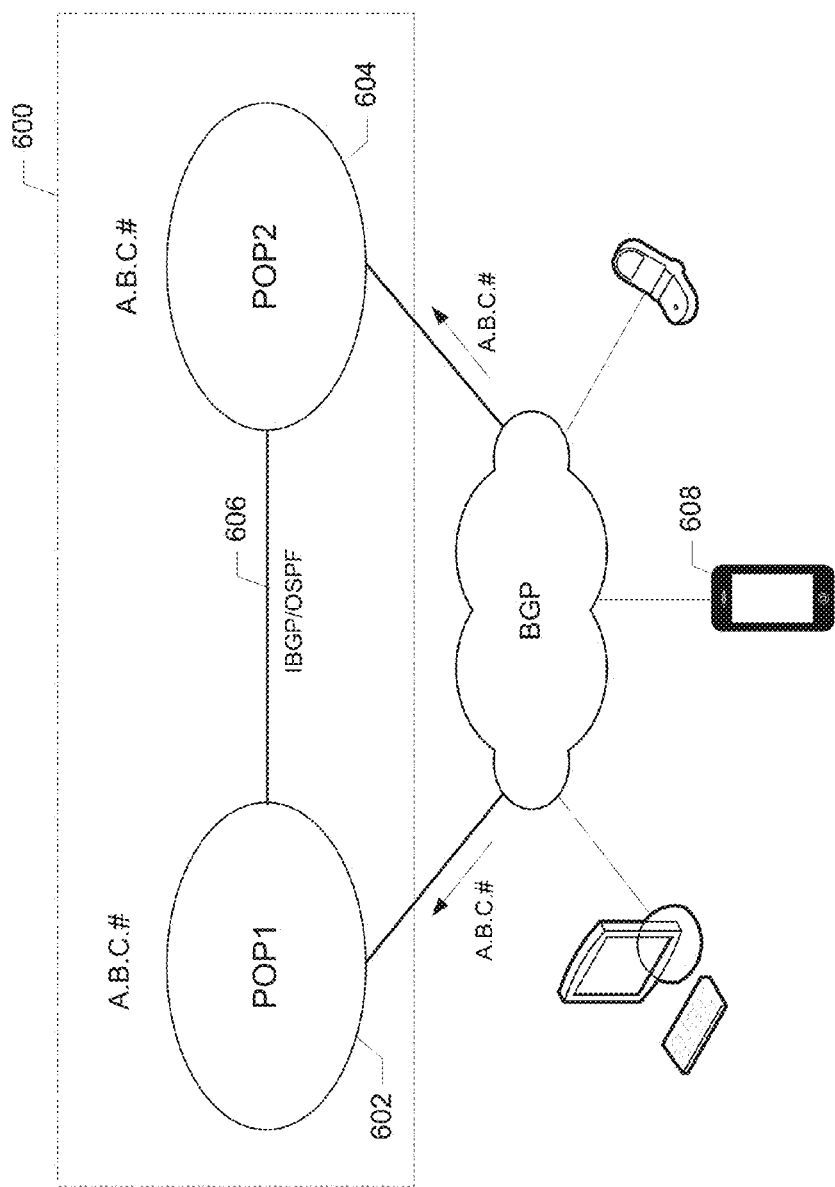
FIG. 6 is another simplified diagram of a services system illustrating high availability mechanisms.

Referring now to the example illustrated in FIG. 6, an IP address range A.B.C.# is advertised for both data centers 602 and 604 of a services system 600. Client devices near one or the other location and attempting to connect using address in the advertised range will be more likely to connect with the geographically closer location according to BGP. In some cases, both data centers can be "live" and responsible for providing the service to the client devices that connect with them due to geographic proximity. In other cases where only one of the locations is live, the traffic that tends toward the dormant location may be routed internally to the live location, e.g., using IBGP or the Open Shortest Path First (OSPF) protocol, via a high bandwidth, cross-POP link 606. This can be done, for example, by statically configuring edge routers at the data center or dynamically configuring edge routers using a suitable route health injection mechanism.

OSPF is an adaptive routing protocol for Internet Protocol (IP) networks. OSPF is an interior gateway protocol that routes Internet Protocol (IP) packets within a single routing domain (e.g., an autonomous system). It gathers link state information from available routers and constructs a topology map of the network. The topology determines the routing table presented to the Internet Layer which makes routing decisions based on the destination IP address found in IP packets. OSPF is described in RFC 2328 from the IETF Network Working Group published in April 1998, and RFC 5340 from the IETF Network Working Group published in July 2008, the entirety of each of which is incorporated herein by reference for all purposes.

In either case, if a failure or interruption of some kind occurs at one of the data centers, servicing of the clients being handled by the failed location may be routed internally to the other location, e.g., via cross-POP link 606. If the failure results in an inability to connect with the failed data center entirely, the devices being handled by that location can connect with the other data center using the same IP address. Advertisement of the IP address range at the failed location may also be terminated, in which case the client devices being handled by that location will connect with the other data center directly. Therefore, even though some clients may experience an interruption in service, reconnection to the service may be done using the same IP address, thereby minimizing the interruption.

According to a particular implementation, if the system detects that a single client device attempts (e.g., smart phone 608) to connect with more than one of the data centers advertising the same IP address range within a relatively short programmable period of time, the system can switch that client device to a unicast approach. That is, the system provisions that client device with a unique address for only one of the data centers for accessing the service. This addresses the possible instability that may result for some client devices in the anycast scenario, e.g., where the client device is equidistant to two data centers.

Figure 7:
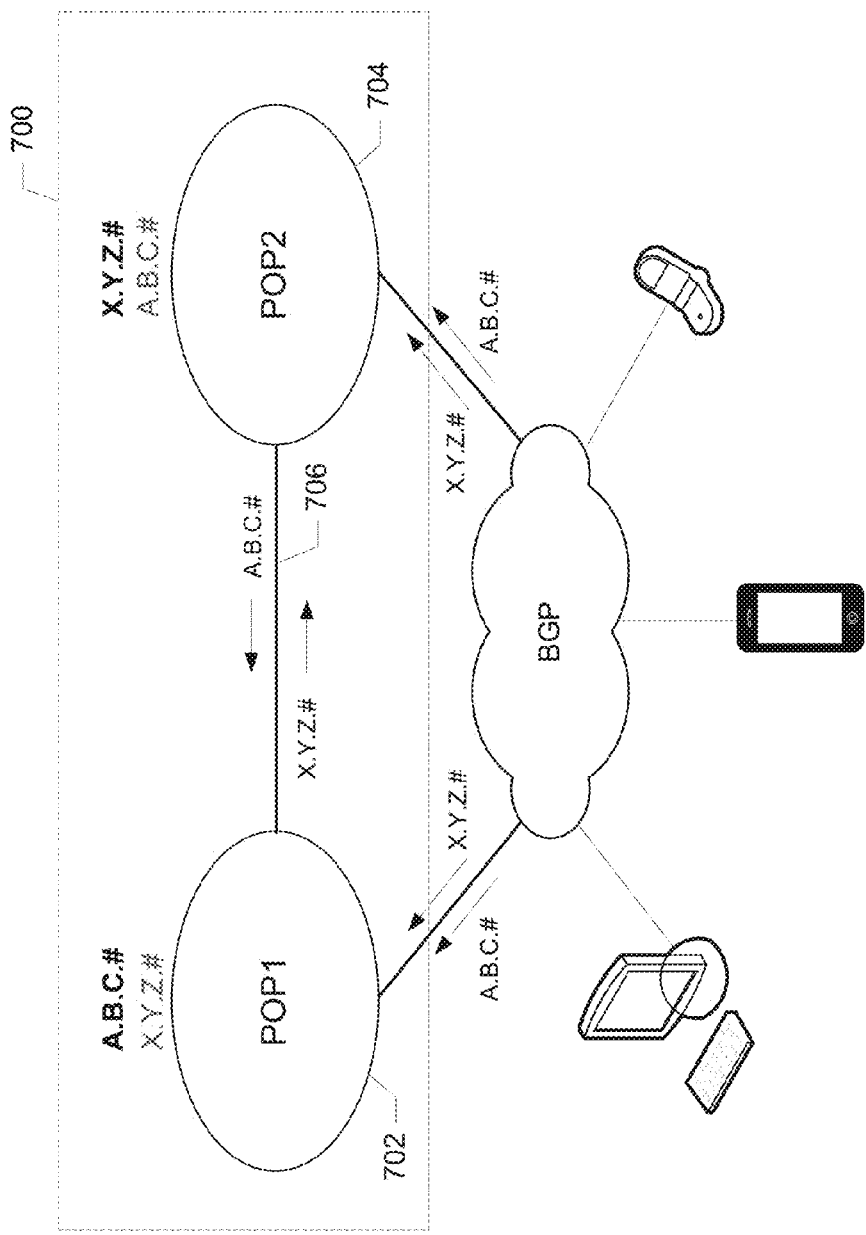
FIG. 7 is yet another simplified diagram of a services system illustrating high availability mechanisms.

In another example of the use of anycast illustrated in FIG. 7, IP address ranges A.B.C.# and X.Y.Z.# are both advertised for both data centers 702 and 704 of services system 700, both of which are intended to be active. In the depicted example, the range A.B.C.# is the primary range for data center 702 and the range X.Y.Z.# is the primary range for data center 704. As with the previous example described above with reference to FIG. 6, client devices will tend to connect with the geographically closer data center. However, as shown in this example, if a client device connects with the data center using an IP address in the primary range of the other data center, that connection is routed internally to the other data center for handling, e.g., via a cross-POP link 706. Again, this may be handled by static or dynamic configuration of edge routers.

If either of the data centers goes down, all traffic for both IP address ranges will, by default, automatically go to the other data center. If the failure or interruption at one of the data centers is less catastrophic, e.g., the data center can still receive traffic but an insufficient number of SIP end points are available, some or all of the traffic that would normally be handled locally can be internally routed to the other data center, e.g., via a cross-POP link. If the cross-POP link goes down, both data centers may be configured to handle traffic for both address ranges locally.

According to some implementations, the handling of failover scenarios can be achieved by manual reconfiguration of network resources. According to other implementations, route health injection mechanisms may be employed to enable the dynamic configuration of network resources to handle the various failover scenarios. Each data center would have one or more health checkers which monitor the health of the various components of the system and, when a failure is detected, send instructions (or alert another device to send instructions) to appropriate system components to appropriately reconfigure the system. For example, one or more health checkers placed in a first data center can be configured to monitor system components in a second data center so that when the second data center encounters problems, the system can still be reconfigured by the health checkers placed in the first data center. In another example, one or more health checkers can be placed outside of the data centers to monitor the health of various system components in the data centers and send instructions to reconfigure the system as appropriate.

For example, if it is determined that an insufficient number of SIP end points are available in a data center, the routing tables of an edge router associated with the data center may be dynamically reconfigured to switch the traffic to another data center. In another example in which the same address ranges are associated with multiple data centers, if it is determined that another data center for which a particular address range had been designated as the primary range is no longer accessible, the routing tables of an edge router may be dynamically reconfigured to allow local handling of traffic directed to the primary address range of the failed data center rather than rerouting it. In yet another example, if it is determined that SIP end points corresponding to particular IP addresses in the range associated with a data center are not available, those IP addresses may be reassigned to other end points associated with that data center. Other examples of the handling of a wide variety of failover scenarios will be apparent to those of skill in the art.

According to another class of implementations, DNS SRV is employed to promote high availability of a services system (e.g., a communications system as described above) in a manner similar to that described above with reference to FIGS. 3-5 except that one or more of the SRV records with which a client device is provisioned corresponds to an anycast address that may be associated with one or more SIP end points in one or more data centers of the system. FIG. 8 shows an example of a set of SRV records with which a client might be provisioned in which the first six records correspond to end points in two different data centers in a manner similar to the sets of 6 shown in and described above with reference to FIG. 4. By contrast, the seventh and eighth SRV records in this example correspond to anycast addresses. As will become clear, such implementations provide failover mechanisms on both the client side and at the data center that govern how to reconnect with the service in the event of a failure rather than relying on a single mechanism.

When a client device that supports DNS SRV registers with the services system it is provisioned with a set of SRV records as discussed above with reference to FIG. 5. However, in this case, at least one (and possibly more than one) of the SRV records corresponds to an anycast address. According to some implementations, the SRV record(s) corresponding to the anycast address(es) are lower in priority than the one or more SRV records corresponding to unicast addresses. For example, the SRV records might include a first SRV record having the highest priority which corresponds to a unicast address associated with the geographically closest data center; a second SRV record having a lower priority which corresponds to a unicast address associated with a geographically more distant data center; and an anycast address associated with both data centers.

When attempting to access the service in this example scenario, the client device provisioned according to these SRV records first attempts to connect with the unicast address specified by the highest priority SRV record. If the attempt is unsuccessful, or if the corresponding end point or data center goes down after a connection is established, the client device automatically attempts to connect with the unicast address specified by the second, lower priority SRV record. Again, if the attempt is unsuccessful or the connection is interrupted, the client device proceeds to the next option which, in this case, is the anycast address specified by the third SRV record. This connection may be established and/or failed over as described above with reference to the FIGS. 6 and 7.

It should be noted that implementations employing various combinations of the high availability mechanisms described herein are contemplated. For example, implementations of services systems are contemplated which support some client devices with DNS SRV, and other client devices with single-address anycast. Implementations of services systems are also contemplated which support some client devices with DNS SRV in which some SRV records correspond to anycast addresses, and other client devices with single-address anycast. Other suitable variations of the functionalities and techniques described herein will be apparent to those of skill in the art.

According to some implementations, the priority and/or weighting of the SRV records with which a client device is provisioned may vary depending on a variety of parameters, e.g., the geographic location of the requesting client device, or the capacity and/or load of particular data centers. For example, in a system in which multiple data centers advertise the same anycast address ranges (e.g., as discussed above with reference to FIG. 7), a client device might have multiple SRV records corresponding to anycast addresses in multiple ranges that are prioritized to favor the primary range(s) of the geographically closer data center(s).

It should be noted that, despite references to particular computing paradigms and software tools herein, the computer program instructions with which embodiments of the invention may be implemented may correspond to any of a wide variety of programming languages and software tools, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities described herein may be effected or employed at different locations. In addition, reference to particular protocols herein are merely by way of example. Suitable alternatives known to those of skill in the art may be employed without departing from the scope of the invention.

While the invention has been particularly shown and described with reference to specific embodiments thereof, it will be understood by those skilled in the art that changes in the form and details of the disclosed embodiments may be made without departing from the spirit or scope of the invention. For example, although various embodiments described herein refer to SIP as the application layer protocol, and although there are advantages associated with the use of SIP (e.g., supports multiple transport protocols (e.g., TCP, UDP, TCP+TLS), support for IPv4 and IPv6 is inheritable, etc.), services employing other application layer protocols may be implemented to take advantage of the automatic failover mechanisms described.

In another example, in implementations using anycast, an IP address that is in the address range associated with a particular data center may correspond to one or more SIP end points in that data center. Having multiple end points correspond to one IP address might be useful, for example, to support load balancing among the end points using any of a variety of load balancing techniques.

In another example, although implementations employing anycast have been described above with examples showing two data centers and one or two address ranges, it will be understood that implementations are contemplated in which an arbitrary number of data centers and address ranges are employed.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for provisioning a device to access a service provided by a plurality of service end points associated with a plurality of distinct portions of a network, the method comprising, provisioning the device with a plurality of domain name system (DNS) service records that are simultaneously stored by the device, each of a first subset of the DNS service records corresponding to a first type of destination address, each of the first type of destination address being associated with at least one of the service end points in only one of the distinct portions of the network, each of a second subset of the DNS service records corresponding to a second type of destination address, each of the second type of destination address being simultaneously associated with at least one of the service end points in each of at least two of the distinct portions of the network.

2. The method of claim 1 wherein the first subset of DNS service records is higher priority than the second subset of DNS service records.

3. The method of claim 1 wherein the first subset of DNS service records includes a first group of one or more DNS service records corresponding to a first one of the distinct portions of the network, and a second group of one or more DNS service records corresponding to a second one of the distinct portions of the network, and wherein the first group of DNS service records is higher priority than the second group of DNS service records.

4. The method of claim 1 wherein the second subset of DNS service records includes a first group of one or more DNS service records corresponding to both of first and second ones of the distinct portions of the network, and a second group of one or more DNS service records corresponding to both of the first and second distinct portions of the network, and wherein the first group of DNS service records is higher priority than the second group of DNS service records.

5. A computer-implemented method for accessing a service provided by a plurality of service end points associated with a plurality of distinct portions of a network, the method comprising:

retrieving a first one of a plurality of domain name system (DNS) service records simultaneously stored by a device requesting access to the service, each of a first subset of the DNS service records corresponding to a first type of destination address, each of the first type of destination address being associated with at least one of the service end points in only one of the distinct portions of the network, each of a second subset of the DNS service records corresponding to a second type of destination address, each of the second type of destination address being simultaneously associated with at least one of the service end points in each of at least two of the distinct portions of the network;

transmitting a first request to access the service to the destination address corresponding to the first DNS service record;

where the first request to access the service is not successful, or where a connection to the service established using the first DNS service record is interrupted, retrieving a second one of the plurality of DNS service records; and transmitting a second request to access the service to the destination address corresponding to the second DNS service record.

6. The method of claim 5 wherein the first subset of DNS service records is higher priority than the second subset of DNS service records, and wherein attempts to connect with the service are made using all of the first subset of DNS service records before an attempt to connect with the service is made using any of the second subset of DNS service records.

7. The method of claim 5 wherein the first subset of DNS service records includes a first group of one or more DNS service records corresponding to a first one of the distinct portions of the network, and a second group of one or more DNS service records corresponding to a second one of the distinct portions of the network, and wherein the first group of DNS service records is higher priority than the second group of DNS service records, and wherein attempts to connect with the service are made using all of the first group of DNS service records before an attempt to connect with the service is made using any of the second group of DNS service records.

8. The method of claim 5 wherein the second subset of DNS service records includes a first group of one or more DNS service records corresponding to both of first and second ones of the distinct portions of the network, and a second group of one or more DNS service records corresponding to both of the first and second distinct portions of the network, and wherein the first group of DNS service records is higher priority than the second group of DNS service records, and wherein attempts to connect with the service are made using all of the first group of DNS service records before an attempt to connect with the service is made using any of the second group of DNS service records.

9. The method of claim 5 wherein the device requesting access to the services comprises one of a cell phone, a smart phone, a tablet, a laptop computer, a desktop computer, a telephone, an Internet Protocol phone, a set top box, or a gaming console.

10. A cloud-based service, comprising a plurality of computing devices deployed in a plurality of distinct portions of a network, the plurality of computing devices being configured to provide a plurality of service end points associated with each of the distinct portions of the network, each of the service end points being configured to provide access to a service to requesting devices, one or more of the computing devices in each of the distinct portions of the network further being configured to associate a range of first destination addresses and a range of second destination addresses with the corresponding distinct portion of the network, wherein each range of first destination addresses is associated with only one of the distinct portions of the network, and wherein each range of second destination addresses is associated with two or more of the distinct portions of the network, wherein the plurality of computing devices are configured to provision each of first ones of the requesting devices to access the service with a plurality of domain name system (DNS) service records simultaneously stored by each requesting device, each of a first subset of the DNS service records corresponding to one of the first destination addresses in one of the ranges of first destination addresses, each of the first destination addresses being associated with one or more of the service end points in the corresponding one of the distinct portions of the network, and each of a second subset of the DNS service records corresponding to one of the second destination addresses in one of the ranges of second destination addresses, each of the second destination addresses being simultaneously associated with one or more of the service end points in each of at least two of the distinct portions of the network.

11. The cloud-based service of claim 10 wherein a specific one of the second destination addresses is associated with first and second ones of the distinct portions of the network, and wherein one or more of the computing devices in the first distinct portion of the network are configured to route traffic corresponding to the specific second destination address to the second distinct portion of the network within the cloud-based service.

12. The cloud-based service of claim 11 wherein the one or more computing devices in the first distinct portion of the network are further configured to handle the traffic corresponding to the specific second destination address locally where the second distinct portion of the network is unable to handle the traffic.

13. The cloud-based service of claim 10 wherein a specific one of the second destination addresses is associated with first and second ones of the distinct portions of the network, and wherein one or more of the computing devices in both the first and second distinct portions of the network are configured to handle traffic corresponding to the specific second destination address locally.

14. The cloud-based service of claim 10 wherein the one or more computing devices in the plurality of distinct portions of the network are further configured to provision each of second ones of the requesting devices using only a single one of the DNS service records from the second subset of DNS service records.

15. The cloud-based service of claim 10 wherein the plurality of DNS service records with which each of the first requesting devices is provisioned includes two or more DNS service records from the first subset of DNS service records, the two or more DNS service records each having a priority associated therewith, the priorities of the two or more DNS service records corresponding to a load balancing scheme.

16. The cloud-based service of claim 10 wherein the first subset of DNS service records is higher priority than the second subset of DNS service records.

17. The cloud-based service of claim 10 wherein the first subset of DNS service records includes a first group of one or more DNS service records corresponding to a first one of the distinct portions of the network, and a second group of one or more DNS service records corresponding to a second one of the distinct portions of the network, and wherein the first group of DNS service records is higher priority than the second group of DNS service records.

18. The cloud-based service of claim 10 wherein the second subset of DNS service records includes a first group of one or more DNS service records corresponding to both of first and second ones of the distinct portions of the network, and a second group of one or more DNS service records corresponding to both of the first and second distinct portions of the network, and wherein the first group of DNS service records is higher priority than the second group of DNS service records.

19. The cloud-based service of claim 10 wherein the service comprises a communication service.

\* \* \* \* \*